United States Patent [19]

Pompen et al.

[11] Patent Number: 5,169,667
[45] Date of Patent: Dec. 8, 1992

[54] PROCESS FRO PREPARING A MEAT-BASED SPREADABLE PRODUCT

[75] Inventors: Gerardus Pompen; Hugh Stewart, both of Oss, Netherlands

[73] Assignee: Van den Bergh Foods Co., Division of Conopco Inc., Lisle, Ill.

[21] Appl. No.: 850,230

[22] Filed: Mar. 11, 1992

Related U.S. Application Data

[62] Division of Ser. No. 532,475, Jun. 1, 1990, Pat. No. 5,118,523.

[30] Foreign Application Priority Data

Jun. 14, 1989 [EP] European Pat. Off. ........ 89201539.7

[51] Int. Cl.⁵ .............................................. A23L 1/317
[52] U.S. Cl. ..................................... 426/589; 426/646
[58] Field of Search ............... 426/589, 606, 607, 641, 426/646, 652, 643, 644, 407

[56] References Cited

U.S. PATENT DOCUMENTS

| | | | |
|---|---|---|---|
| 3,309,204 | 3/1967 | Helmer et al. | 426/646 |
| 3,600,186 | 8/1971 | Mattson et al. | 426/611 |
| 4,119,735 | 10/1978 | Maher et al. | 426/646 X |
| 4,206,239 | 6/1980 | Horner | 426/589 X |
| 4,472,448 | 9/1984 | Haggerty et al. | 426/589 |

FOREIGN PATENT DOCUMENTS

| | | | |
|---|---|---|---|
| 452429 | 3/1972 | Australia | 426/646 |
| 2317045 | 10/1974 | Fed. Rep. of Germany . | |
| 2639177 | 3/1978 | Fed. Rep. of Germany . | |
| 2506125 | 11/1982 | France . | |
| 599793 | 3/1978 | U.S.S.R. | 426/646 |
| 1065917 | 4/1967 | United Kingdom . | |
| 2101465 | 1/1983 | United Kingdom . | |

OTHER PUBLICATIONS

Komacik et al, *Food Products Formulary*, vol. 1, 1974, pp. 114–118.
Chemical Abstracts, 107: 174779d.

Primary Examiner—Arthur L. Corbin
Attorney, Agent, or Firm—Rimma Mitelman

[57] ABSTRACT

A meat-based spreadable product is prepared by comminuting and admixing 15–40 wt. % of lean meat having at most 15 wt. % of fat, 10–30 wt. % of precooked meat fibres, 0.5–3 wt. % of alkali metal caseinate and up to 35 wt. % of an oil or fat composition having at most 35% saturated fatty acid residues in the digestible part and a PUFA to MUFA to SAFA ratio of 1:(0.2–1.1):(0.1–0.8) (all percentages based on the final product).

11 Claims, No Drawings

PROCESS FRO PREPARING A MEAT-BASED SPREADABLE PRODUCT

This is a divisional of Ser. No. 07/532,475, filed Jun. 1, 1990, now U.S. Pat. No. 5,118,523.

The present invention relates to a meat-based spreadable product comprising a relatively large amount of digestible polyunsaturated fatty acid residues and a reduced amount of saturated fatty acid residues.

RELATED ART

Such products have been described in German Patent Application DE-B-2 317 045 (G. Frey). In this patent application meat products, like liver sausages, are prepared using an emulsion which is obtained by emulsifying vegetable oils and fats having a high content of polyunsaturated fatty acids by means of at most 10% by weight of caseinate and meat bouillon.

In German Patent Application DE-B-2 639 177 (H. Hohenester), dietetic meat pastes have been described, which are prepared by mixing 44-59% by weight of lean meat with 34-42% by weight of skimmed milk, then blending this mixture with an emulsion of skimmed milk, caseinate and vegetable oil (in the weight ratio skimmed milk:caseinate:vegetable oil=8:1:5) and homogenizing the obtained blend. As the vegetable oil 5-12% by weight of wheat germ oil or sunflower oil may be used, having at least 70% of polyunsaturated fatty acids.

The disadvantage of these products is that the presence of meat bouillon or skimmed milk causes serious problems with regard to the physical and bacteriological stability of the obtained meat products.

SUMMARY OF THE INVENTION

The present invention wants to avoid these problems, and to this purpose a meat-based spreadable product is prepared, using a mixture of precooked meat fibres and a fat or oil composition, in the digestible part of which the fatty acid residues comprise a maximum of 35% of saturated fatty acid residues and the ratio of polyunsaturated fatty acid (PUFA) residues to monounsaturated fatty acid (MUFA) residues to saturated fatty acid (SAFA) residues is 1:(0.2-1.1):(0.1-0.8).

Preferably, the fatty acid residues in the digestible part of the fat composition comprise at most 25% of saturated fatty acid residues and, preferably, the amount of MUFA is at least one third of the amount of PUFA. Especially about equal amounts of MUFA and PUFA are preferred.

The conjoint use of precooked meat fibres and the specific unsaturated fat or oil composition leads to products which are physically and bacteriologically stable and at the same time exhibit particularly favourable dietetic properties.

DETAILED DESCRIPTION

Therefore, the present invention relates to a meat-based spreadable product comprising from 15% to 40% by weight (based on the final product) of lean meat having at most 15% by weight of fat, from 10% to 30% by weight (based on the final product) of precooked meat fibres, from 0.5% to 3% by weight (based on the final product) of alkali metal caseinate and up to 35% by weight (based on the final product) of an oil or fat composition, in the digestible part of which the fatty acid residues comprise a maximum of 35% of saturated fatty acid residues and the ratio of polyunsaturated fatty acid residues to mono-unsaturated fatty acid residues to saturated fatty acid residues is 1:(0.2-1.1):(0.1-0.8).

By "meat" is understood throughout this application and the attached claims the meat of mammals, fish (including shell fish) and poultry, and mixtures of these types of meat.

The precooked meat fibres preferably have a characteristic dimension of from 5 to 20 mm. In some cases the precooked meat fibres may comprise the lean meat, and in that case the amount of precooked meat fibres may be proportionately higher.

The alkali metal caseinate may be the sodium or the potassium caseinate and, particularly in case low-sodium products are required, also mixtures of these caseinates may be used. The alkali metal caseinate may also be replaced by the proportionate amount of milk protein.

The oil or fat composition may be a single oil, like sunflower seed oil, or a mixture of oils, such as a mixture of sunflower and maize or corn oil. An oil or fat composition which consists of a liquid oil and a so-called hard stock, which is a saturated fat fraction, is preferred.

Particularly preferred is the use of an oil or fat composition, comprising a liquid oil having a high PUFA/SAFA ratio and a hard stock comprising a nondigestible fat replacer, particularly a polyol fatty acid polyester such as the sugar fatty acid polyesters.

By a "polyol" is understood throughout this specification and the attached claims a polyhydric alcohol having at least four free hydroxyl groups. Such polyols in particular include the group of sugar polyols, which comprises the sugars, i.e. the mono-, di- and polysaccharides, the corresponding sugar alcohols and the derivatives thereof having at least four free hydroxyl groups. A preferred sugar polyol is sucrose.

By a "polyol fatty acid polyester" is understood throughout this specification and the attached claims any such polyesters or mixtures thereof of which, on an average, more than 70% of the polyol hydroxyl groups have been esterified with straight or branched chain $C_8$-$C_{22}$ fatty acids. Preferably, polyol fatty acid polyesters are used with higher degrees of conversion, in particular polyol fatty acid polyesters of which, on an average, more than 85% or even over 95% of the polyol hydroxyl groups have been esterified with fatty acids.

By the term "non-digestible" is understood throughout this specification and the attached claims that at least 70% by weight of the material concerned is not digestible by the human body.

The meat-based spreadable products according to the present invention may also comprise functional additives, selected from the group consisting of: curing salt, common salt, herbs, spices, flavouring agents, colouring agents, sugars, antioxidants, preservatives, emulsifiers, stabilizers, vegetables, dairy products like cheese, proteins of animal, vegetable or mycotic origin, and mixtures thereof. Usually these additives are applied in an amount of up to 10% by weight, but sometimes a functional additive may be applied in greater amounts, particularly when it is used as an extender.

The invention also relates to a process for the preparation of a meat-based spreadable product which comprises:

(a) comminuting 15% to 40% by weight (based on the final product) of lean meat having at most 15% by weight of fat, 0.5% to 3% by weight (based on the final product) of alkali metal caseinate and up to 35% by weight (based on the final product) of an oil or fat composition, in the digestible part of which the fatty acid residues comprise a maximum of 35% of saturated fatty acid residues, and the ratio of polyunsaturated fatty acid residues to mono-fatty acid residues to saturated fatty acid residues is 1:(0.2–1.1):(0.1–0.8) while heating to at most 75° C.;

(b) adding water, salt and optionally functional additives during this comminution at a temperature between 65° C. and 75° C.; and (c) admixing from 10 to 30% by weight (based on the final product) of precooked meat fibres.

Optionally, the product obtained is filled into cans, sterilized (e.g. 40 minutes at 114° C. under overpressure) and subsequently cooled. The comminution is preferably carried out in a cutter.

The invention is now illustrated by the following examples, which in no way are to be construed as limiting the scope of the present invention.

EXAMPLE I 675 grams of lean beef having 10 wt. % of fat were mixed with 900 grams of a fat blend of 87 wt. % of sunflower oil and 13 wt. % of a hard stock based on a palm kernel oil fraction having a melting point of 58° C., the digestible part of the fat blend having a saturated fatty acid residue content of 19% and a ratio of polyunsaturated fatty acid residues to mono-unsaturated fatty acid residues of 3.5:1 respectively, while chopping and heating to 75° C. in a bowl-chopper. To the mixture obtained were added 45 grams of curing salt (comprising 0.9 wt. % of sodium nitrite), 690 grams of water, 19.5 grams of a spice mixture, 10.5 grams of sugar and 60.0 grams of sodium caseinate, and the bowl-chopping was continued until an emulsion was obtained (at 45°–50° C.). Finally, 600 grams of precooked lean beef fibres (having a dimension of 15 mm×15 mm) were mixed in. After this, the mixing was finished by mixing for 2 minutes under vacuum. The mixture obtained was filled into cans, which were sterilized for 40 minutes at a temperature of 114° C. at 1.2 bar of over-pressure. The sterilized cans were finally cooled slowly. The calculated cholesterol content of the product obtained was 32 mg/100 grams.

An excellently spreadable, very tasty meat-based product was obtained.

EXAMPLE II

Example I was repeated, using the same amounts of the same ingredients with the exception that instead of the 675 grams of lean beef, 675 grams of chicken breast were used and instead of the precooked lean beef fibres, now 600 grams of precooked chicken fibres were used of 15 mm ×15 mm. An excellently spreadable, chicken product was obtained, having a cholesterol content of 42 mg/100 grams.

EXAMPLE III

Example I was repeated, using 690 grams of lean pork meat having 10 wt. % of fat, but in this case only 675 grams of water were used. An excellently spreadable, tasty pork meat-based spread was obtained.

EXAMPLE IV 240 grams of salmon, 210 grams of shrimps and 240 grams of cod were mixed with 900 grams of the fat blend as described in Example I whilst chopping and heating to 65° C. in a bowl-chopper.

To the mixture obtained, were added: 45 grams of curing salt (comprising 0.9 wt. % of sodium nitrite), 645 grams of broth, 15 grams of a spice mixture, 45 grams of tomato puree and 60 grams of sodium caseinate and the bowl-chopping was continued until an emulsion was obtained (at 45°–50° C).

Finally, 600 grams of precooked pollack fibres (having a dimension of 20 mm×20 mm) were mixed in. After this, the mixing was finished by mixing for 2 minutes under vacuum. The mixture obtained was filled into cans, which were sterilized for 40 minutes at a temperature of 114° C. with 1.2 bar of over-pressure. The sterilized cans were cooled slowly.

An excellently spreadable, tasty fish meat-based spread product was obtained.

EXAMPLE V 675 grams of lean beef and 900 grams of sunflower oil were mixed while chopping and heating to 75° C. in a bowl-chopper.

To the mixture obtained were added 45 grams of curing salt (comprising 0.9 wt. % of sodium nitrite), 690 grams of water, 19.5 grams of a spice mixture, 10.5 grams of sugar and 60.0 grams of sodium caseinate, and bowl-chopping was continued until an emulsion was obtained (at 45°–50° C.). Finally, 600 grams of precooked lean beef fibres (having a dimension of 15 mm×15 mm) were mixed in and the last 2 minutes of the mixing were performed under vacuum.

The mixture obtained was filled into tubs, which were pasteurized at 90° C. for 60 minutes. The pasteurized tubs were finally cooled slowly.

An excellently spreadable, tasty meat-based spread was obtained.

We claim:

1. A process for the preparation of a meat-based spreadable product having a blood cholesterol lowering effect, which comprises:

(a) comminuting 15% to 40% by weight (based on the final product) of lean meat having at most 15% by weight of fat, 0.5% to 3% by weight (based on the final product) of alkali metal caseinate and an oil or fat composition, in an amount up to 35% by weight (based on the final product), in the digestible part of which comprises a maximum of 35% of saturated fatty acid residues, and has a ratio of polyunsaturated fatty acid residues to monounsaturated unsaturated fatty acid residues to saturated fatty acid residues of 1:(0.2–1.1):(0.1–0.8), while heating at a temperature up to 75° C.;

(b) adding water, salt and optionally functional additives during said comminuting at a temperature between 65° C. and 75° C. to obtain an emulsion; and (c) admixing from 10 to 30% by weight (based on the final product) of precooked meat fibres with the emulsion obtained in (b).

2. A process according to claim 1, in which the product is filled into cans, sterilized and subsequently cooled.

3. A process according to claim 1, in which the meat is selected from the group consisting of: mammal meat, fish meat, shellfish, poultry meat, and mixtures thereof.

4. A process according to claim 1, in which the alkali metal caseinate is sodium or potassium caseinate.

5. A process according to claim 1, in which the digestible part of the oil or fat composition comprises at most 25% of saturated fatty acid residues.

6. A process according to claim 1, in which in the digestible part of the oil or fat composition, the amount of mono-unsaturated fatty acid residues is at least one third of the amount of the polyunsaturated fatty acid residues.

7. A process according to claim 1, in which the oil or fat composition is selected from the group consisting of: a single oil, a mixture of oils, and a liquid oil and a hard stock.

8. A process according to claim 7, in which the hard stock is a non-digestible fat replacer.

9. A process according to claim 7, in which the hard stock is a polyol fatty acid polyester of which, on an average, more than 70% of the polyol hydroxyl groups $C_{22}$ fatty acids.

10. A process according to claim 7, in which the hard stock is a sucrose straight or branched chain $C_8$-$C_{22}$ fatty acid polyester.

11. A process according to claim 1, in which the functional additives are selected from the group consisting of: curing salt, common salt, herbs, spices, flavouring agents, colouring agents, sugars, antioxidants, preservatives, emulsifiers, stabilizers, vegetables, dairy products, protein of animal, vegetable or mycotic origin, and mixtures thereof.

* * * * *